United States Patent [19]
Herbert

[11] Patent Number: 5,132,606
[45] Date of Patent: Jul. 21, 1992

[54] METHOD AND APPARATUS FOR CONTROLLING THE INPUT IMPEDANCE OF A POWER CONVERTER

[76] Inventor: Edward Herbert, 1 Dyer Cemetery Rd., Canton, Conn. 06019

[21] Appl. No.: 638,197

[22] Filed: Jan. 7, 1991

[51] Int. Cl.[5] .............................................. G05F 1/563
[52] U.S. Cl. ................................ 323/266; 323/272; 323/285; 363/89
[58] Field of Search ............... 307/82, 207; 323/266, 323/271, 272, 282, 285, 351; 363/34, 37, 65, 71, 86, 89, 126

[56] References Cited

U.S. PATENT DOCUMENTS

| | | | |
|---|---|---|---|
| 3,768,001 | 10/1973 | Thorberg | 363/71 |
| 3,914,617 | 10/1975 | Corbel | 323/271 |
| 4,666,020 | 5/1987 | Watanabe | 363/37 |
| 4,713,742 | 12/1987 | Parsley | 323/272 |
| 4,783,728 | 11/1988 | Hoffman | 363/37 |
| 4,816,739 | 3/1989 | Sakurai et al. | 323/272 |

Primary Examiner—Jeffrey Sterrett
Attorney, Agent, or Firm—McCormick, Paulding & Huber

[57] ABSTRACT

A DC-DC power converter adaptable for use with an AC input, uses feed forward control of the output power to control the input power and the dynamic resistance of the input to ensure a high power factor in the AC input embodiments of the converter. The dynamic response of the power converter is controlled by feed forward, either through scheduling the energy content of a storage capacitor as an explicit function of the output power, the input voltage and the time constant, or through energy deficit feed forward in which the energy deficit caused by a transient is fed forward as an increment of power under feed forward control. Line frequency ripple feed forward compensates the feed forward in the embodiments having an AC input for any half frequency harmonics present in full wave rectified input due to a DC offset or asymmetry in the AC input. With load anticipation feed forward control, input power transitions smoothly without overshoot for a step change of output load from no load to full load and back.

17 Claims, 11 Drawing Sheets

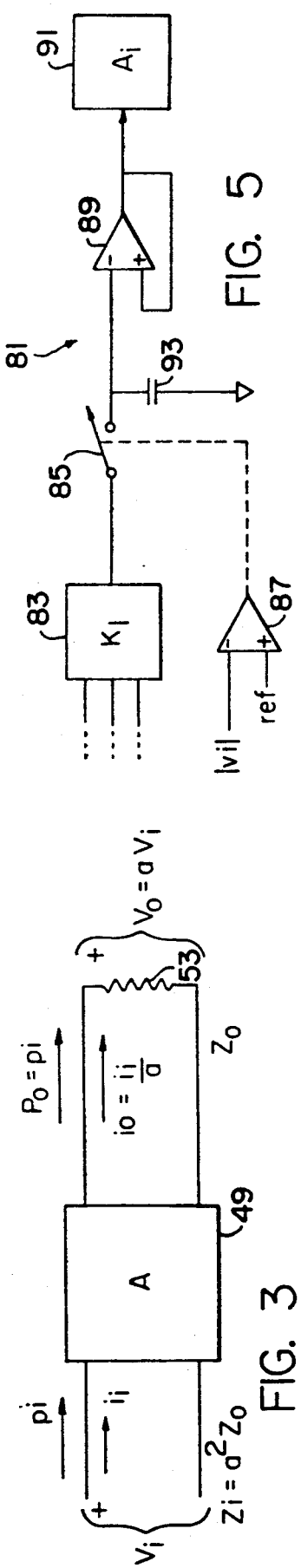
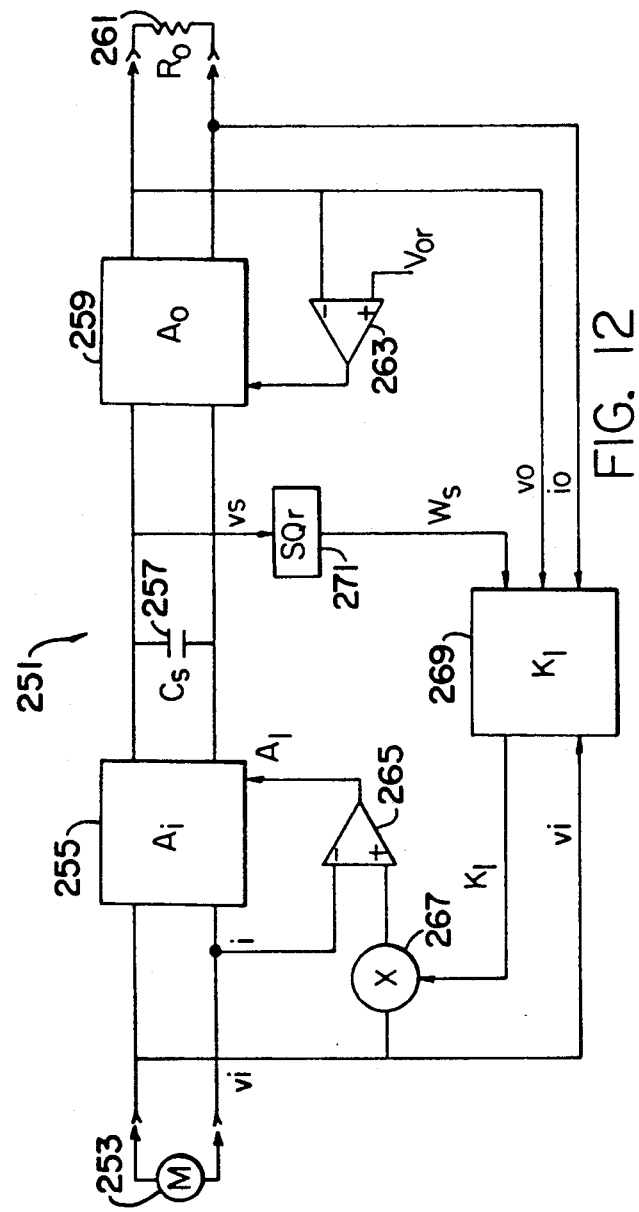
FIG. 5
FIG. 3
FIG. 12

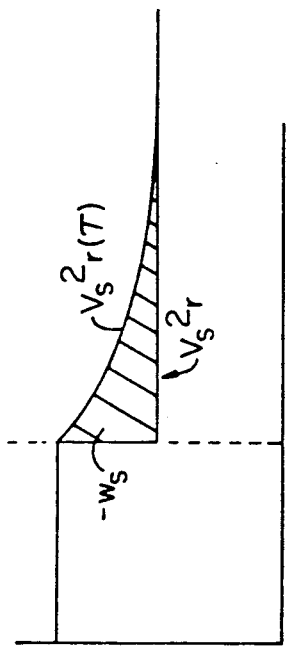
FIG. 10c
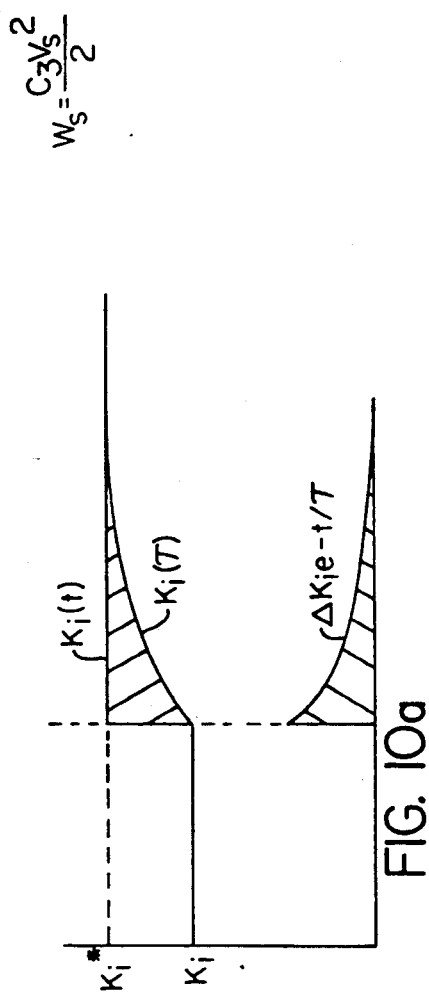
FIG. 10a
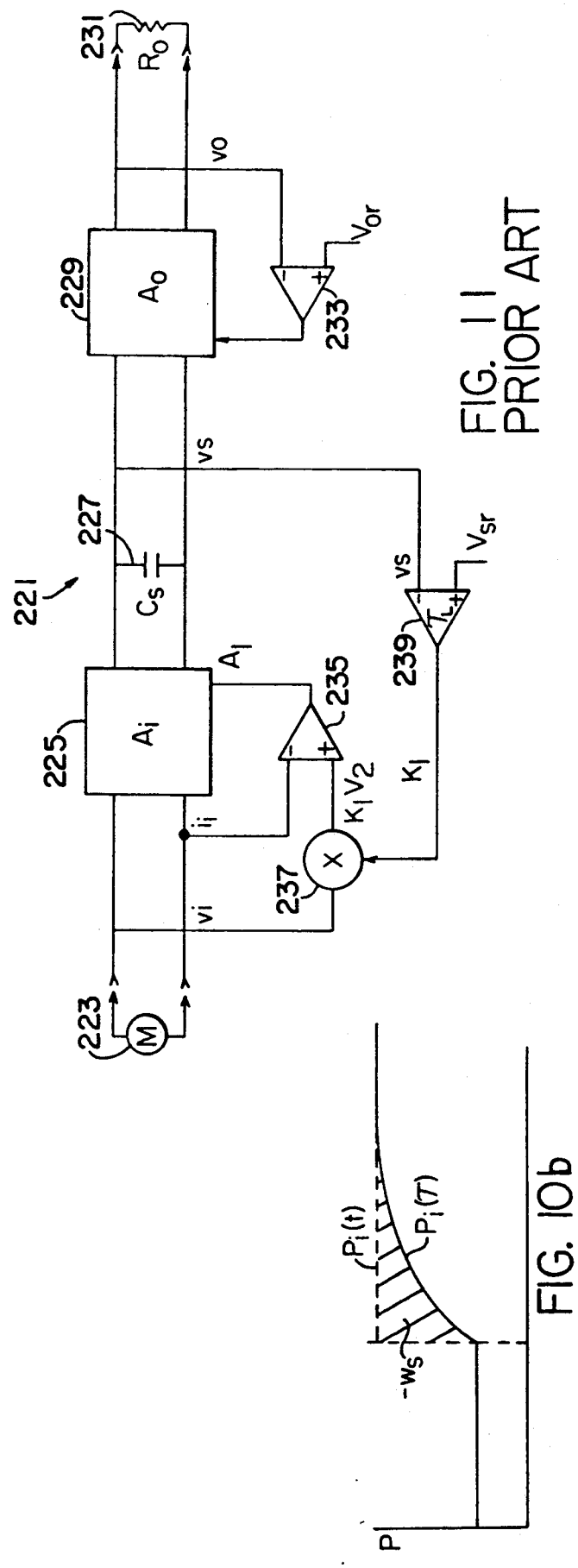
FIG. 11 PRIOR ART
FIG. 10b

METHOD AND APPARATUS FOR CONTROLLING THE INPUT IMPEDANCE OF A POWER CONVERTER

BACKGROUND OF THE INVENTION

The present invention relates generally to power converter systems, in particularly to DC-DC power converters, DC-DC power converters having input rectifiers to adapt them for AC-DC power conversion, and AC-DC power converters having control algorithms to improve power factor.

It is well known that an input power source is often not suitable for direct application to the load, and that power conversion is necessary. It is well established in the art to provide power conversion from one voltage and current level to another voltage and current level, and a high degree of sophistication has been achieved in the control and protection circuits of such converters.

It is less well recognized that the rate at which power is delivered to the load and the rate at which power is received from the input power source are often incompatible. The problem is usually recognized in the context of "noise rejection" and "frequency response to transients". It is generally addressed through the use of L-C filters and feed back control loops. The L-C filters, being resonant, are a source of some problems.

A sub-set of power converters, known generally as "high power factor AC-DC converters" does control the rate at which power is received from the input power source to provide high power factor. However, these converters are characteristically plagued with problems of energy management. Usually the voltage of a storage capacitor is sensed and used as feed-back to correct the input current control function. If its gain is too high, the power factor is compromised. The input current control function can be held constant using a latching function for each half cycle of the input AC voltage. While providing excellent power factor correction, the latching function creates a sampling limitation in the cross over frequency of the feed back control loop. Input voltage feed forward can be used to improve the response to transients in the input voltage. None the less, energy control tends to be poor, the storage capacitor is generally unnecessarily large and the control is generally subject to poor response and large overshoots.

The high power factor AC-DC converters typically have an input regulator, a storage capacitor and an output regulator essentially in series so that all of the output power must pass through both regulators.

High power factor AC-DC converters often use a boost converter for the input stage, which presents severe problems upon the application of input power and in overload conditions, or whenever the output voltage is lower than the input voltage.

It is an object of this invention to provide a DC-DC power converter in which the control of power flow and energy is improved.

It is a further object of this invention to provide an improved method of control of a DC-DC converter using feed forward techniques on the system input parameters, principally $V_o$, $I_o$, $V_i$ and $\eta$ (output voltage, output current, input voltage and efficiency).

It is a further object of this invention to provide an improved method of control of a DC-DC converter using feed forward techniques to control the converter dynamic response, using energy deficit feed forward and/or scheduling of the storage capacitor voltage as a function of the energy content of the transient response.

It is a further object of this invention to provide a DC-DC converter having controlled dynamic input resistance.

It is a further object of this invention to provide a DC-DC converter having parallel modulators for reduced losses.

It is a further object of this invention to provide a DC-DC converter using a two-input buck converter.

It is a further object of this invention to extend the application of the improved DC-DC power converter to applications requiring an AC input and to applications requiring high power factor.

It is a further object of this invention to provide a high power factor AC-DC converter using parallel modulators including a two-input buck converter, to overcome the problems associated with a boost converter input stage.

SUMMARY OF THE INVENTION

This invention teaches that the control of a DC-DC converter can be implemented using energy control, knowing the power of the input, the output and the losses, and knowing the energy content of the transients. This method of control transcends the modulators and is linear.

This invention also teaches that a control algorithm can be written as a function of the system input parameters, $V_o$, $I_o$, $V_i$ and $\eta$, and that this algorithm can be applied as a feed forward control.

This invention also teaches that a control algorithm can be written as a function of the energy content of the transients, and that this algorithm can be applied as a feed forward control. The energy deficit of a transient can be measured and reapplied to the system as feed forward, or voltage scheduling of the energy storage capacitor voltage can be used to balance the energy content of the storage capacitor with the energy content of the transients, so as to manage the energy content of transients systematically rather that "control" transients as an "error" using feedback.

This invention also teaches that the characteristic negative input resistance of a power converter can be modified dynamically, to provide positive resistance or infinite resistance, and that providing positive resistance is an effective method of providing high power factor in a DC-DC converter which has been adapted for AC input.

This invention also teaches that parallel modulators can be used to provide energy control, with one path providing power directly to the output to the extent that the input power is sufficient, and with a parallel path providing energy storage. The parallel path provides energy to the output when the input power is insufficient, and stores energy when the input power is more than sufficient.

This invention also teaches that a two-input buck converter can be used in a DC-DC converter having parallel modulators, and that one of the inputs of the two-input buck converter can have a voltage which is lower than the output voltage.

This invention also teaches the use of the DC-DC power converter with an AC input power source, and for high power factor.

BRIEF DESCRIPTION OF THE DRAWINGS

FIG. 3 defines a modulator.

FIG. 5 shows a prior art sample and hold circuit.

FIGS. 10a, 10b, and 10c are a graphical explanation of the method of energy surplus and energy scheduling.

FIG. 11 is a block diagram of prior art control.

FIG. 12 is a block diagram of feed forward control using this invention.

DESCRIPTION OF THE PREFERRED EMBODIMENTS

Figure 1:
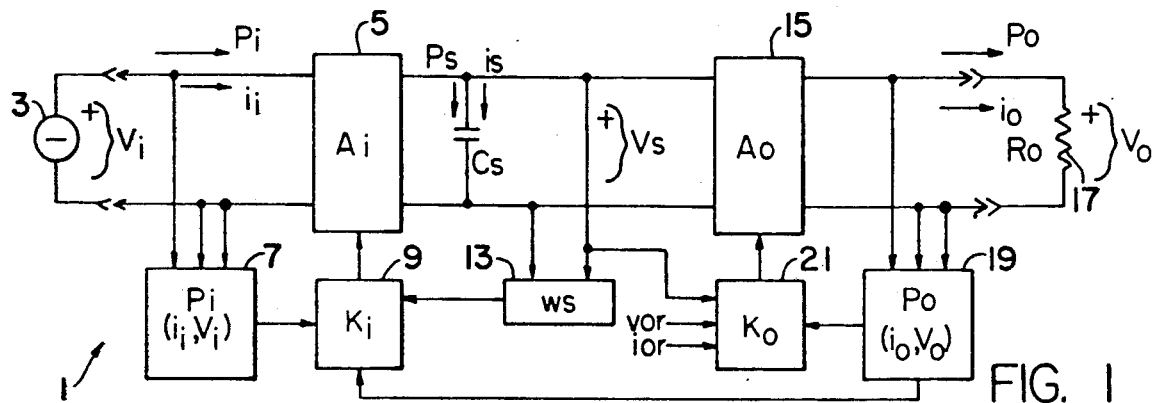
FIG. 1 shows a power converter having two modulators, energy storage and feed forward control.

FIG. 1 shows a DC-DC converter 1 having an input power source shown as a DC power source 3, providing power to an input modulator 5. An output modulator 15 provides power to an external load 17. The output of the input modulator 5 provides power to a storage capacitor 11 and to the input of the output modulator 15.

A input sensing circuit 7 senses the input power $p_i$, and may quantize input voltage $v_i$, input current $i_i$ and/or input power $p_i$. An output sensing circuit 19 senses the output power, and may quantize output voltage, $v_o$, output current $i_o$ and/or output power $p_o$.

An energy sensing circuit 13 measures the energy $w_s$ in the storage capacitor 11 as a function of the square of the voltage $v_s$ of the storage capacitor 11.

An output control circuit 21 implements an output control algorithm $K_o$ to control the output modulator 15. The inputs to the output control may be output voltage $v_o$, output current $i_o$ and the input voltage $v_s$ to the output modulator 15. The reference voltage and/or current to which control is maintained may be fixed or variable, internal or externally programmable. Provision for external references is shown as $v_{or}$, $i_{or}$. The components comprising the output modulator 15, the output sensing circuits 19 and the output control circuits 21 essentially comprise a DC-DC converter having $v_s$ as its input power source and $v_o$ as its output. It may be a voltage regulator, and may have over current limiting. It may use feed back of the output voltage $v_o$ and current $i_o$, and may use feed forward of the input voltage $v_s$ to the output modulator 15. In many respects it is a DC-DC converter of usual design, well known to the art.

An input control circuit 9 implements an input control algorithm $K_i$ to control the input modulator 5. The inputs to the input control circuit may be the output voltage $v_o$, the output current $i_o$, or their product, the output power $p_o$, the input voltage, $v_i$, the input current $i_i$, and the energy in the storage capacitor $w_s$.

In operation, the input modulator 5, its input sense circuit 7, the energy sense circuit 13 and its control circuit 9 control and modulate the input power from the power source 3 so as to be compatible with the input power source 3 and to deliver the correct power to the output modulator 15. The output modulator 15, its output sense circuit 19 and its control circuit 21 control and modulate the output power as it is required for the output load 17. To the extent that the input power $p_i$ and the output power $p_o$ are momentarily different, energy is store in, or taken from, the storage capacitor 11. The methods of control are taught in more detail after several of the preferred embodiments are explained.

Figure 2:
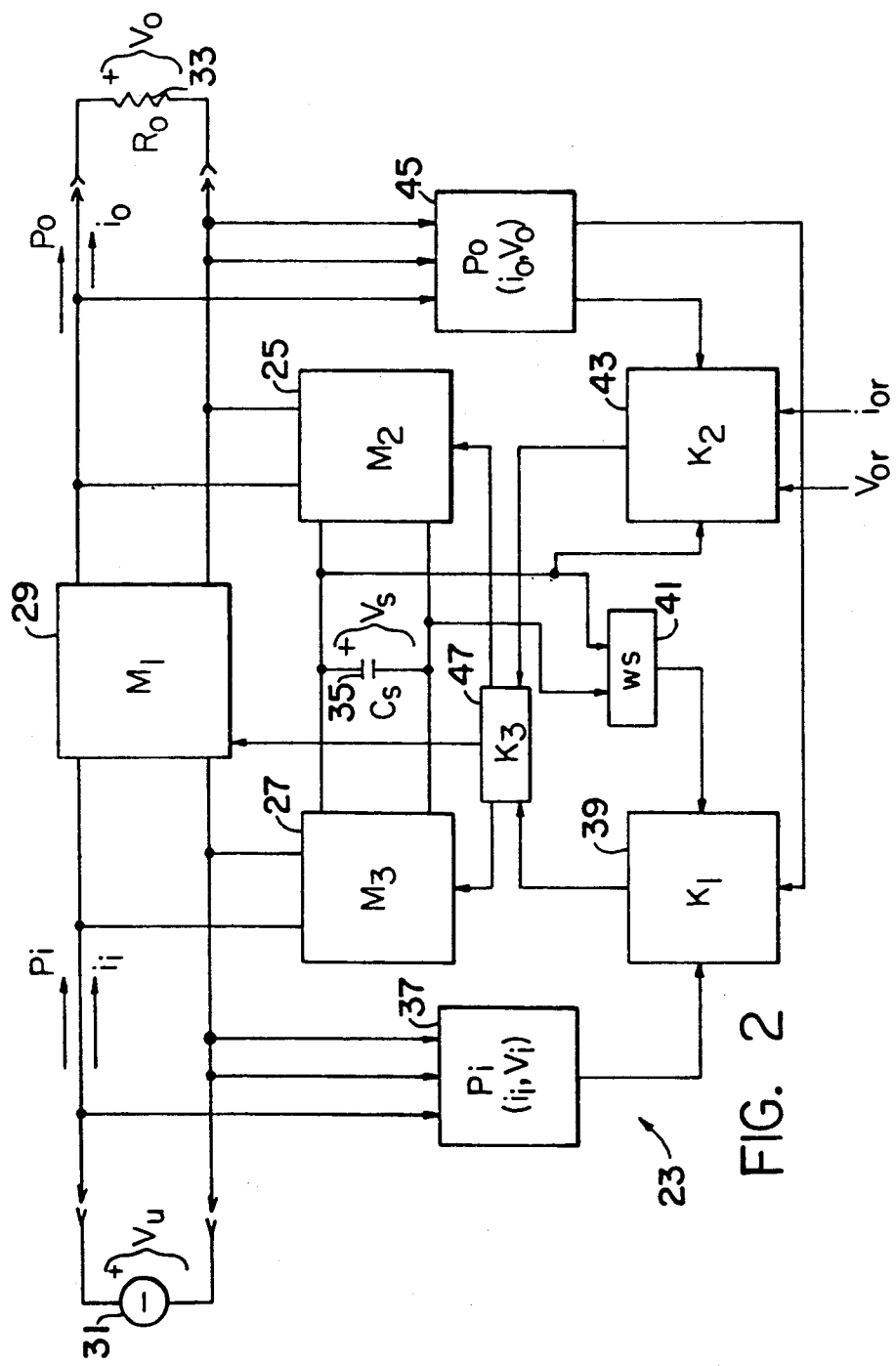
FIG. 2 shows a power converter having parallel modulators, energy storage and feed forward control.

FIG. 2 shows a DC-DC converter 23 having the same input and output, and the same sensing circuits and control circuits as the DC-DC converter of FIG. 1. However, it differs by the use of parallel modulators. A first modulator 29 receives power from the power source 31, and, to the extent that the power from the power source 31 is sufficient, the power is modulated and supplied to the external load 33. To the extent that the output power from the first modulator 29 is insufficient, a second modulator 25 takes energy from the storage capacitor 35, modulates it and supplies it as power to the external load 33. To the extent that the power from the power source 31 is more than sufficient, a third modulator 27 receives power from the power source 31, modulates it and supplies it to the storage capacitor 35 for storage as energy.

The sensing and control of the DC-DC converter of FIG. 2 are the same as the sensing and control of the DC-DC converter of FIG. 1 except for the addition of a sequencing and arbitrating circuit 47. In concept, the first modulator 29 is operated only until the control circuit 39 or control circuit 43 has its control function satisfied, whichever is first. If the control function of control circuit 43 is not then satisfied, the second modulator 25 is operated until it is. If the control function of control circuit 39 is not then satisfied, the third modulator 27 is operated until it is. In any control cycle, the operation of the second modulator 25 and the operation of the third modulator 27 is mutually exclusive.

FIG. 3 shows a modulator "A" and defines its function. Ideally, the input power and the output power are equal, and the modulator provides no energy storage. The modulator 49 converts the input voltage $v_i$ and input current $i_i$ to be compatible with an external load 53. The modulator factor in FIG. 3 is "a". The output voltage $v_o$ equals the input voltage $v_i$ times a. The output current $i_o$ equals the input current $i_i$ divided by a. The modulator factor may vary with time, under control.

Figure 4:
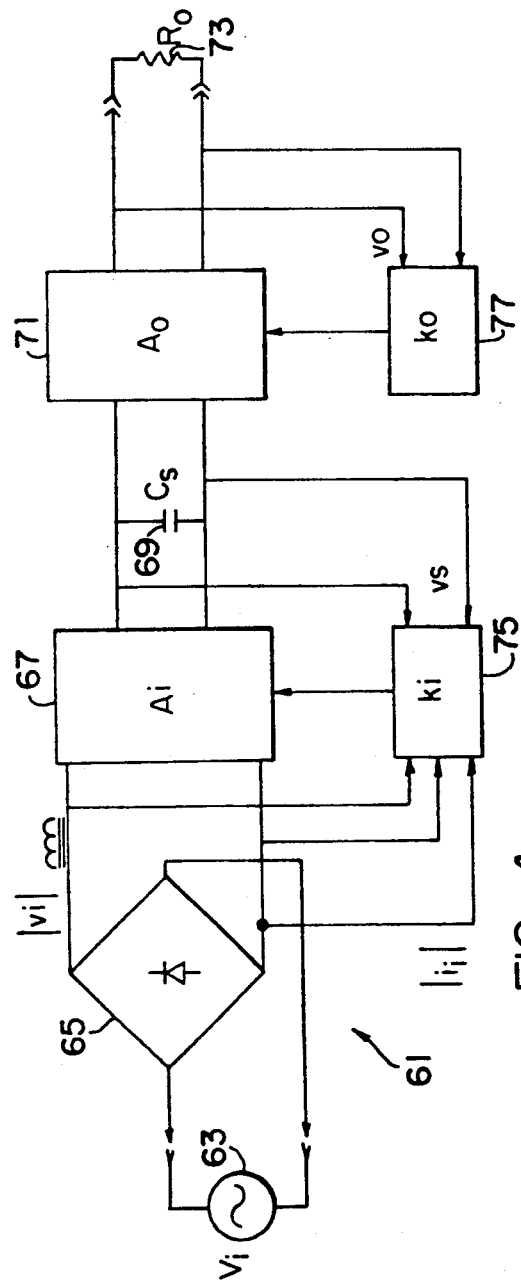
FIG. 4 shows a prior art high power factor AC-DC converter.

FIG. 4 shows present art, and is a "high power factor AC-DC conversion" 61 having an AC input power source 63 and an input full wave rectifier 65 at its input. The input $v_i$ becomes $|v_i|$ at the input of the input modulator 67. The input modulator 67 has its output connected to a storage capacitor 69 and to the input of the output modulator 71, just as in the DC-DC converter of FIG. 1. The output of the output modulator 71 supplies power to an external load 73.

For high power factor, the input control circuit 75 will control the input modulator 67 so that its input current $|i_i|$ will be proportional to $|v_i|$. However, if the control constant $K_i$ is incorrect, over time the input power will differ from the output power, and either too much or too little energy will be stored in the storage capacitor 69. This results in an error in the storage capacitor voltage $v_s$, which is fed-back to modify the control constant $K_i$.

It is well known that if the feed-back control loop has too much gain and too high a crossover frequency, $K_i$ will not approximate a constant, and the power factor correction will be compromised.

To improve power factor correction, a sample and hold circuit 81 such as the one shown in FIG. 5 may be used. A comparator 87 senses the start of each half cycle of the input voltage and causes a switch 85 to close momentarily. The output of the control circuit 83 is thus connected to the sample and hold amplifier 89 and its holding capacitor 93. In this manner, the control factor $K_i$, as applied to the input modulator 91, is held constant until the next half cycle. This technique is known.

Figure 6:
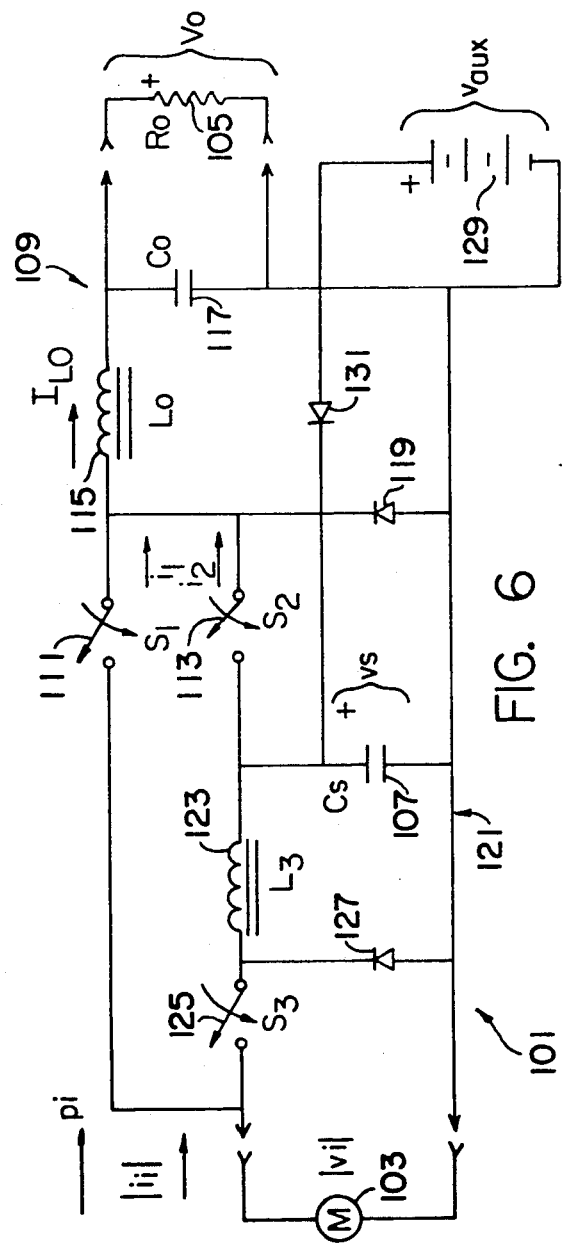
FIG. 6 is a schematic of the power circuits for a power converter using parallel modulators.

FIG. 6 shows the power circuits 101 of a DC-DC converter which would be suitable for implementating the DC-DC converter of FIG. 2. The sensing and control circuits are not shown. An input power source 103, shown as having the voltage wave form $|v_i|$ of a full wave rectified AC voltage, is connected to a first switch 111 and a third switch 125. The first switch 111 is part of a two input buck converter 109 comprising the first switch 111, a second switch 113, a rectifier 119, an inductor 115 and an output filter capacitor 117. The second switch 113 of the two input buck converter 109 is connected to a storage capacitor 107.

The third switch 125 is connected to a buck converter 121 comprising the third switch 125, a rectifier 127 and an inductor 123. The storage capacitor 107 is connected to the output of the inductor 123.

FIG. 6 also shows that the DC-DC converter 101 may have an auxiliary power source 129. This input can be connected through a rectifier 131 to the storage capacitor 107. The normal voltage $v_s$ on the storage capacitor 107 is higher than the auxiliary power source 129 so that the rectifier 131 is kept reverse biased. The auxiliary power source 129 has a higher voltage $V_{aux}$ than the minimum input voltage required by the converter 109 to maintain regulation.

In describing the operation of the DC-DC converter 101 of FIG. 6, it will be assumed to be ideal, at steady state conditions, and that the control circuits are configured for high power factor.

Because the input voltage $|v_i|$ is usually an independent variable, input power control is accomplished by controlling input current $|i_i|$. Further, for high power factor, the input resistance is controlled to be a fixed positive resistance. The input power is given by $$p_i = v_i i_i = v_i I \sin^2(\omega t) \qquad [1]$$

$$p_i = \frac{V_i I_i}{2} - \frac{V_i I_i}{2} \cos(2\omega t) \qquad [2]$$

In a sinusoidal AC voltage, the half power point occurs when the input voltage $|v_i|$ equals the RMS voltage $V_{iRMS}$. Therefore, when the input voltage $|v_i|$ is less than $V_{iRMS}$, the input power $p_o$ will be insufficient. When $|v_i|$ is greater than $V_{iRMS}$, the input power $p_i$ will be more than sufficient.

Looking first at the buck converter 121, the converter 121 implements the M3 modulator function of FIG. 2, and is operative only when the input power is more than sufficient. This occurs when $|v_i| > V_{iRMS}$, so in accordance with the well understood principles of buck converter design, the voltage $v_s$ of the storage capacitor 107 can be any voltage which is less than the lowest RMS voltage of the input voltage source 103.

Looking now at the two input buck converter 109, usually a buck converter cannot have its input voltage less than the output voltage. In as much as $|v_i|$ goes to zero, buck converters usually cannot be used with a full wave rectified AC power source. However, in the two input buck converter 109, it is sufficient if one of its inputs is higher than the output voltage. If the one input is sufficiently higher than the output voltage, the other input can be lower than the output, even zero or negative. (With a negative input, the rectifier 119, which functions as a switch, would have to be a switch).

The control relationships of the two input buck converter 109 are given by $$V_o = D_1|v_i| + D_2 v_s \qquad [3]$$

$$i_1 = D_1 I_{LO} \qquad [4]$$

$$i_2 = D_2 I_{LO} \qquad [5]$$

$D_1$ and $D_2$ are the duty cycles of $S_1$ and $S_2$ respectively.

In describing the general operating concept of the converter of FIG. 2, it was implied that $S_1$ would operate first. In practice, it is preferred that $S_2$ operate just before $S_1$, to ensure that the inductor current $I_{LO}$ is maximum, when $|v_i| < V_o$. This is a necessary condition for operating with discontinuous conduction. The operating time (closure) of the switches $S_1$ and $S_2$ must be mutually exclusive, unless diode isolation is provided.

Figure 7:
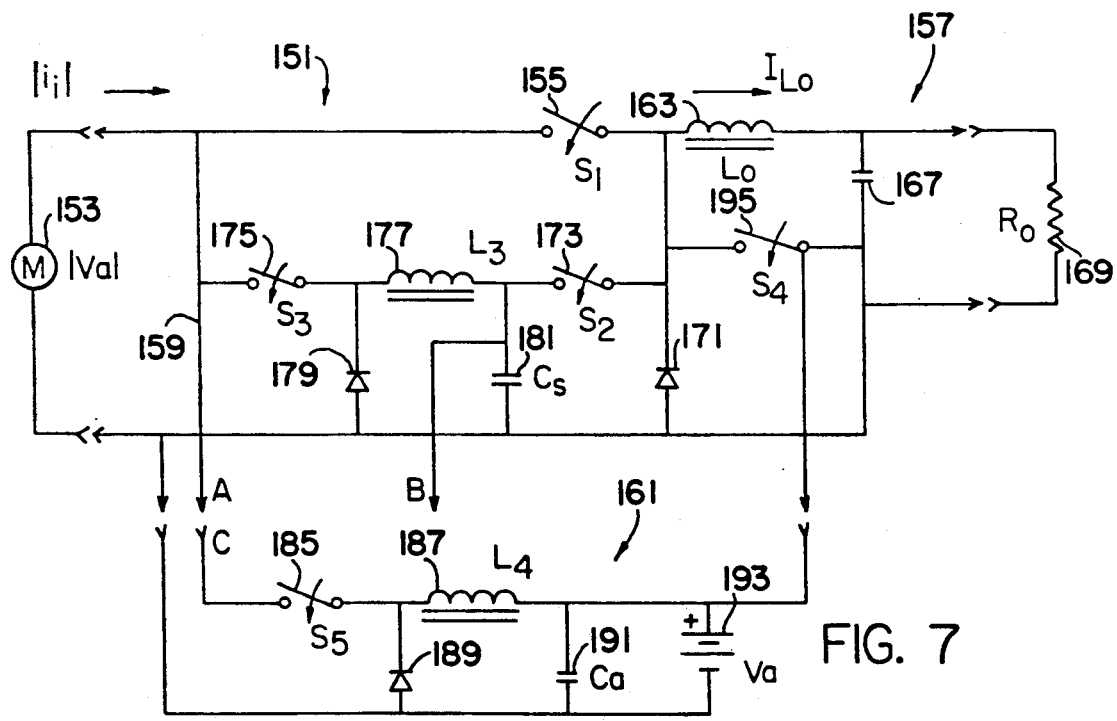
FIG. 7 is a schematic of the power circuits for a another embodiment of the power converter using parallel modulators.

FIG. 7 shows a converter, similar in many respects to the converter of FIG. 6, but having a different method of incorporating an auxiliary power source. An additional storage capacitor $C_a$ 191 and/or an auxiliary power source $v_a$, shown for illustration as a battery 193 is connected to a fourth switch 195, which in turn is connected to the input of an output inductor 163. The switch 195 can operate in cooperation with a first switch 155 and a second switch 173 as a three input buck converter generally designated as 157. In this manner, the voltage $v_a$ of the battery 193 is less restricted, and the capacitor 191 does not appear in parallel with the storage capacitor 181.

In certain methods of operation described in further detail below, the value of the storage capacitor $C_s$ would influence the algorithm. In the method illustrated in FIG. 7, any value additional capacitance $C_a$ could be added externally, as, for instance, for additional hold up time, without altering the system dynamics in other modes of operation. A buck converter comprising a fifth switch 185, a rectifier 189 and a third inductor 187 can provide a controlled charging circuit for the capacitor 191 and/or the battery 193. There is no theoretical restriction on the operation of the fifth switch 185 and the third switch 175, but if they are mutually exclusive, ripple currents in the input current are reduced, and they may have to be operated under common control for the input current characteristics to be correct. As a trickle charger, these effects may be negligible. The input to the fifth switch 185 could alternatively be connected to the storage capacitor 181 using the alternate connection point "B".

Figure 8:
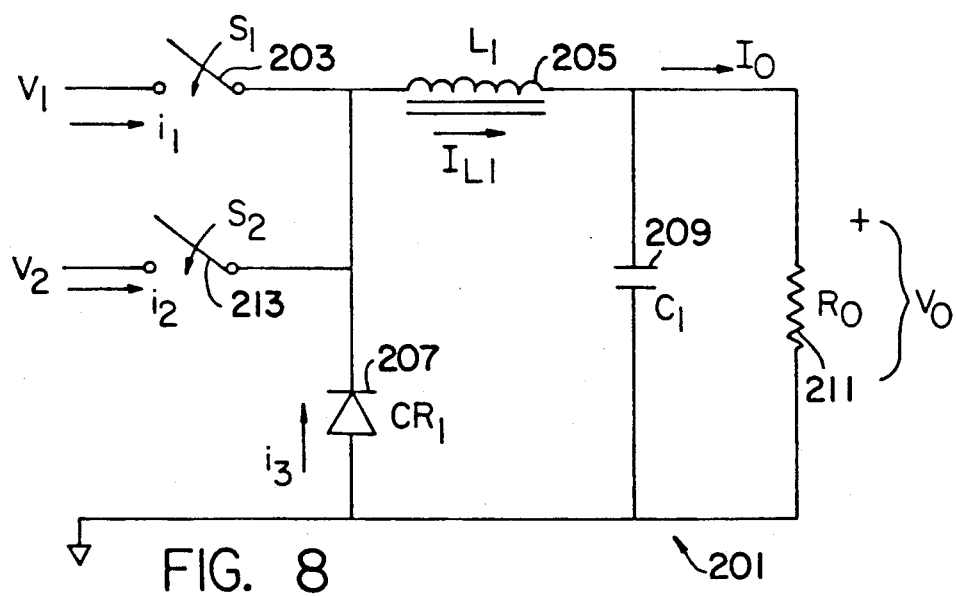
FIG. 8 shows a schematic of a two input buck converter.

FIG. 8 shows the two input buck converter alone, and indeed it can operate as a two input modulator 201 on its own merits, without the other circuits shown in the earlier figures. A first voltage $v_1$ connects to a first switch $S_1$ 203. A second voltage $v_2$ connects to a second switch $S_2$ 213. The other side of both switches is common, and connects to an inductor $L_1$ 205 and a rectifier $Cr_1$ 207. The output of the inductor 205 connects to an output capacitor $C_1$ 209 and load 211 shown as a resistor $R_o$ and has a voltage $v_o$. A first input current $i_1$ is input from the first voltage source $v_1$. A second input current $i_2$ is input from the second voltage source $v_2$. The operation of the converter 201 of FIG. 8 is understood in more detail by reference to FIGS. 9a, 9b and 9c, which show different operating conditions.

Figure 9A:
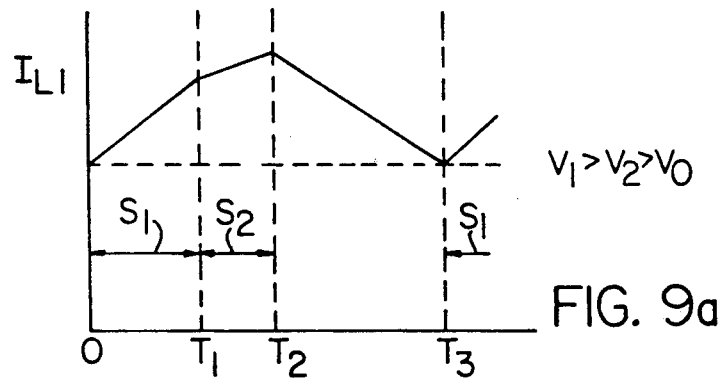
FIGS. 9a, 9b, and 9c show the currents in the two input buck converter for different combinations of input voltage.
Figure 9B:
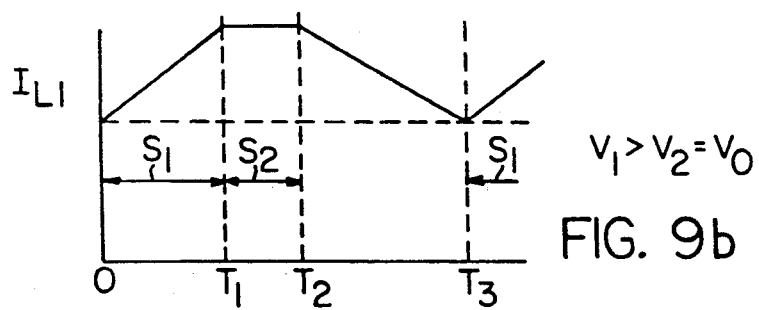

FIG. 9a shows a condition in which the $v_1 > v_2 > v_o$. The current wave form in the inductor $I_{L1}$ is normally a triangular wave form in a single input buck converter, and is familiar to those skilled in the art. A similar wave form would result with either switch $S_1$ or $S_2$ operating alone. With both switches operated, sequentially, the wave form is modified as shown. In a first time segment, $S_1$ is operated, and the current will increase at a slope determined by value of the inductor $L_1$ and the difference between $v_1$ and $v_o$. In the second time segment, switch $S_2$ is operated, and the current increases with a lower slope, because $v_2 < v_1$. Following that is a time of negative slope while the rectifier is conducting.

Figure 9C:
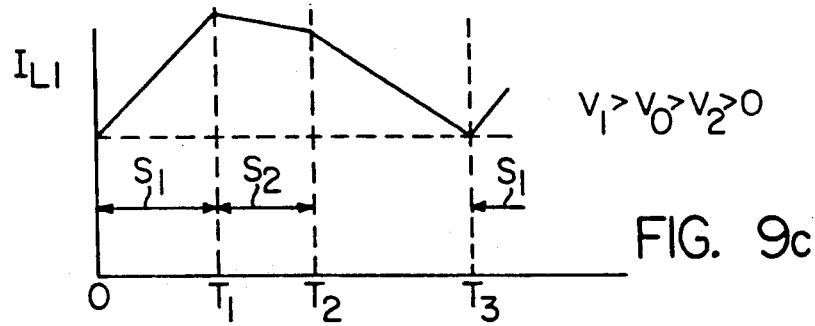

In FIG. 2b, the operation is similar, but in the second time segment when $S_2$ is operated, the slope of the current is flat, because $v_2 = v_o$. In FIG. 9c, the second segment has a down slope, because $v_2 < v_o$. However, because $v_2 > 0$, it is not as steeply down as in the third time segment when the rectifier is conducting.

In this manner, it can be seen that the two input buck converter can be useful for operation with one of its inputs at a voltage which is less than the output. It is therefore useful with a full wave rectified AC input, and could also be used to extract power to the extent that it were available from an input device which was operated at reduced power. Examples might be a battery that was mostly discharged, or a solar panel with low insolation, or a wind generator with a gentle breeze. The second input provides additional power to the load, but the first power source need not be disconnected to switch over just because it is marginally low, and power can continue to be extracted to the extent that it is available.

Turning now to the control function of the DC-DC converter, the output converter can be controlled by feed back of the output parameters using the well know techniques of converter design.

Control of the input converter is more involved, because it has dual purposes, which are in conflict. Over time, the input power $p_i$ must equal the output power $p_o$ (ideally) for the voltage $v_s$ of the storage capacitor $C_s$ to be bounded. Any momentary differences are stored as energy $w_s$ in the storage capacitor.

$$w_s = \int p_i \, dt - \int p_o \, dt + W_s \quad [6]$$

For the voltage $v_s$ of the storage capacitor $C_s$ to be bounded, in stead stage:

$$i_i = \frac{v_o i_o}{v_i} \quad [7]$$

Since $v_i$ is in the denominator, [7] is negative resistance. The input modulator is used to modify the input characteristics to be compatible with the power source. The input may have negative resistance, infinite resistance or positive resistance, and may be a DC input or it may be adapted with a full wave rectifier for an AC input. Other functions could be implemented for special purposes, but in describing the control methods, five cases will be considered.

1. DC input, negative resistance $$I_i = \frac{K_i}{V_i} \quad [8]$$

2. DC input, infinite resistance $$I_i = K_i \quad [9]$$

3. DC input, positive resistance $$I_i = V_i K_i \quad [10]$$

4. Rectified AC input, infinite resistance $$|i_i| = K_i, \quad K_i = f|\sin(\omega t)| \quad [11]$$

5. Rectified AC input, positive resistance $|i_i| = |v_i[K_i]|$

Case 5 is a high power factor converter.

A set of general expressions can be written for the five cases.

The input power can be generalized as $$p_i = f_v K_i \quad [13]$$

where $K_i$ is the control function and $f_v$ is an input voltage function.

The control function can be generalized as $$K_i = \frac{v_o i_o}{F_v} \quad [14]$$

For the general expression [13] and [14], and in the following analysis, $f_v$ and $f_v$ are as follows:

| Case | $f_v$ | $F_v$ |
|---|---|---|
| 1 | 1 | 1 |
| 2 | $V_i$ | $V_i$ |
| 3 | $V_i^2$ | $V_i^2$ |
| 4 | $|V_i|$ | $\frac{V_i}{2|\sin(\omega t)|}$ or* $\frac{V_i}{\sqrt{2}}$ |
| 5 | $v_i^2$ | $V_i^2 \sin^2(wt)$ or* $\frac{V_i^2}{2}$ |

*The second function for $F_v$ in cases 4 and 5 can be used as a simplifying approximation if it is not necessary to account for ripple. At steady state conditions, cases 4 and 5 have AC ripple terms, which are the AC component of the input power term, and which appear on the storage capacitor $C_s$ as a ripple voltage component in $v_s$.

At steady state conditions, cases 4 and 5 have AC ripple terms, which are the AC component of the input power term, and which appear on the storage capacitor $C_s$ as a ripple voltage component in $v_s$.

$$p_s = p_i - p_o \quad [15]$$

In both cases, 4 and 5, the ripple component will be $$p_s = -v_o i_o \cos(2\omega t) \quad [16]$$

The indefinite integral of [16] gives the energy, $w_s$.

$$W_s = -\frac{v_o i_o \sin(2\omega t)}{2\omega} + W_s \quad [17]$$

The energy in a capacitor is $$w_s = \tfrac{1}{2} C_s v_s^2 \quad [18]$$

Solving for the voltage squared $$v_s^2 = -\frac{v_o i_o}{\omega C_s} \sin(2wt) + v_s^2 \quad [19]$$

Equation [19] can be solved for the minimum size of the capacitor $C_s$, given a minimum capacitor voltage $v_s$, a maximum capacitor voltage $v_{s+}$, and $v_o = v_{o+}$ and $i_o = i_{o+}$, their maximum values.

$$C_s = \frac{2 v_{o+} i_{o+}}{\omega (v_{s+}^2 - v_{s-}^2)} \quad [20]$$

In equation [19], $V_s$ is discretionary, within limits, but for an optimally minimized capacitor $C_s$, $V_s$ is given by $$v_s^2 = \frac{v_{s+}^2 + v_{s-}^2}{2} \quad [21]$$

To analyze the transient response to changes of the inputs $v_i$, $v_o$ and/or $i_o$, the power balance just before the transient, by [13] and [15], is $$p_{so} = f_v K_i - v_o i_o = 0 \quad [22]$$

Just after the transient, $K_i$ is not changed (the new values are indicated by *).

$$p_s^* = f_v^* k_i - v_o^* i_o^* \quad [23]$$

Subtracting [22] from [23]

$$p_s = f_v^* K_i - f_v K_1 - v_o^* i_o^* + v_o i_o \quad [24]$$

Dividing by $f_v^*$ $$\frac{p_s}{f_v} = \frac{f_v^*}{f_v} K_i - K_i - \frac{v_o^* i_o^*}{f_v} + \frac{v_o i_o}{f_v} \quad [25]$$

If only the DC component is considered, $f_v \approx F_v$.

$$\frac{v_o i_o}{f_v} \approx \frac{v_o i_o}{F_v} = K_i \quad [26]$$

$$p_s = f_v^* K_i - v_o^* i_o^* \quad [27]$$

Dividing by $f_v^*$ $$\frac{p_s}{f_v^*} = K_i - \frac{v_o^* i_o^*}{f_v^*} \quad [28]$$

By the same rationale as in [26], where $K_i^*$ is the new final value of $K_i$ at the new steady state conditions, $$p_s = f_v^* (K_i^* - K_i^*) \quad [29]$$

$$p_s = f_v^* \Delta K_i \quad [30]$$

The power surplus $p_s$ cannot persist, so $\Delta K_i$ must go to zero over time, as $K_i$ assumes its new value, $K_i^*$. If $K_i$ is an exponential function, $$\Delta K_i(t) = \Delta K_i e^{-t/\tau} \quad [31]$$

$$p_s(t) = f_v^* \Delta K_i e^{-t/\tau} \quad [32]$$

Integrating $$w_s = \int_0^\infty p_s(t)\, dt = F_v^* \Delta K_i \tau + W_s \quad [33]$$

This shows that the energy content of any transient can be solved knowing the DC component of the final input voltage $F_v^*$, the change in $K_i$, $\Delta K_i$, and the time constant $\tau$ of $K_i$.

Given a starting energy $W_s$ in the storage capacitor $C_s$ for a baseline $F_v$ and $K_i$, the energy of a transition to any new values $F_v^*$ and $K_i^*$ is explicitly defined by [33].

The square of the voltage $V_s^*$ of the storage capacitor $C_s$ can be defined as $$v_s^{*2} = \frac{2}{C_s} F_v^* \Delta K_i \tau + V_s^2 \quad [34]$$

Equation [34] shows that the voltage $V_s$ of the storage capacitor $C_s$ can be scheduled as a function of the input voltage $v_i$, the output voltage $v_o$ and the output current $i_o$. (Equation [34] can be solved for $V_s^{*2}$, if the derivation is retraced, retaining all of the AC terms).

Equation [33] defines the "energy of the transients". Using this method, the energy of the transients is stored in the storage capacitor $C_s$ and will be returned when the opposite change in conditions occurs. The energy reference on the storage capacitor, measured as $v_s^2$ must be changed as a function of $v_o$, $i_o$ and $i_o$, and it must be applied as a reference with the same time constant $\tau$. IF this is done, transients do not result in an "error", avoiding the "overshoot" as the "error" is corrected. (The feed back still removes errors resulting from any non-ideality in the algorithm or its approximations or implementation)

This method has the additional advantage that the storage capacitor $C_s$ can be substantially smaller (about half the value, if transient response were dominate in its selection). If the voltage $v_s$ must be returned to a fixed quiescent voltage after each transient, a maximum transient in either direction must be accommodated from the quiescent voltage within the voltage limits of the circuit. Using voltage scheduling, the whole range of the capacitor voltage limits may be used for transients of one direction, retracting for the other direction.

The method of voltage scheduling for the energy of transients can be understood by reference to FIG. 10. A first graph shows $K_i$ versus time. A second graph shows power p versus time, and a third graph shows the energy in the storage capacitor versus time. At time $t_o$, conditions change to require more power, shown as s step change $p_i(t)$, which will result in a change in $K_i$ to $K_i^*$, shown as a step change $K_i(t)$. $K_i$ can be rolled off with a time constant $\tau$, resulting in the exponential curve $K_i(\tau)$. The difference is the curve $\Delta K_i e^{-t/\tau}$.

Because $K_i$ is applied exponentially, the power will rise exponentially too, as shown as $p_i(\tau)$. The area between the curves $p_i(t)$ and $p_i(\tau)$ is the energy surplus $-w_s$ (which is negative). This results in energy being removed from the storage capacitor $C_s$ as shown in the third curve. If the energy reference on the storage capacitor, (quantified as a factor of $v_s^2$) follows the same schedule, the "error" will be zero, except for true errors resulting from non-ideality and implementation approximations and inaccuracies.

Thus the system dynamics in response to transients is separated from the dynamics of the feed back loop.

In controlling the input modulator, feed forward control can be used to minimize the need for feed-back. Feed forward control is essentially open loop control. Feed forward can be applied with respect to an input parameter, and is unconditionally stable if the following criteria are met:

1. The input parameter and its disturbances can be measured.
2. An algorithm can be applied to the control so as to reduce the error on the output resulting from the input parameter and its disturbances.
3. The feed forward does not change the input parameter so as to increase the error.

With respect to the DC-DC converter, three inputs can be identified which are useable as feed forward parameters: input voltage $v_i$, output voltage $v_o$ and output current $i_o$. The parameters $v_o$ and $i_o$ can be combined as their product, output power $p_o$. Efficiency $\eta$ also affects the control, and should be included in the feed forward expressions, either as a measured parameter or an approximation. Second order effects such as heat sink temperature and component values, to the extent that they can be measured, can also be regarded as inputs.

The method of using feed forward is generally contrasted to feed back by reference to FIGS. 11 and 12. FIG. 11 shows prior art, and is a block diagram of a well know high power factor AC-DC converter. Although not shown, it is known to use feed forward of the input voltage magnitude as $v_i^2$.

In FIG. 12, the feed back amplifier 239 has been replaced with a general feed forward control 269 having $v_o$, $i_o$ and $v_i$ as its primary inputs. A degree of feed back is still necessary, however, and is shown in FIG. 12 as an energy feed back $w_s$ which is derived as the square of the voltage $v_s$ of the storage capacitor $C_s$ 257 using the squaring function 271. (The voltage $v_s$ could be used, but the energy $w_s$ is preferred, because it is a linear function of power). The method of energy control using energy feed forward will be explained further in additional examples, below.

Feed forward can be beneficial even if it is imprecise. If it is within plus or minus 100% of ideal, the error will be less than if feed forward control were not used. Phase shift will diminish the effectiveness of feed forward as the cosine of the phase shift. For phase shifts of $\pm 180°$ $\pm 90°$, where the cosine is negative, the feed forward will make the error worse for those frequencies than if feed forward were not used (but it is not unstable).

To the extent that the third criterion is not met, unintended feed-back results, and it should be identified and analyzed using classical feed back analysis. An example would be that feed forward control of a power modulator results in a decrease in input current for an increase of input voltage. If there is source impedance, the input voltage is affected by the change in current, and a degree of unintended feed back is present.

Feed forward control can be implemented in may ways, and common to several methods is the explicit determination of $K_i$ as a function of the inputs. $K_i$ can be applied to the system with a specific function of time, as, for example, [31], so that the system dynamics are systematically controlled, and are not primarily controlled by the feed back loop dynamics.

1. Feed forward can be used to explicitly calculate $K_i$ by [14], for application directly to the input current control. Errors in $K_i$ will result in errors on the capacitor voltage $v_s$. Feed back on the capacitor energy $w_s$ can be used to correct errors in $K_i$, either using a multiplier to change the gain of $K_i$, or by summing in a feed back error term. If the reference on $w_s$ is generated using [34], and $K_i$ is applied using [31], system dynamics will be largely removed from the influence of the control loop, and only the imperfections in implementing [14], [31] and [34] will remain, which can be removed with a slow loop.

Figure 13:
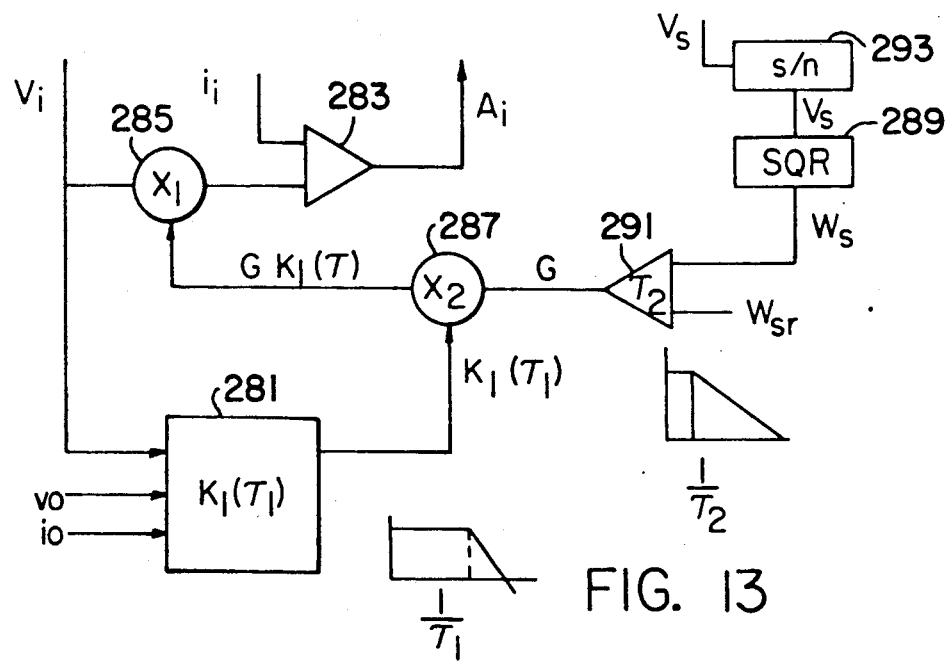
FIG. 13 is a block diagram of an embodiment of the feed forward control.

FIG. 13 shows a control block diagram to implement such a control, and its relationship to FIG. 12 can be seen by the designations of the signals. An explicit function $K_i(\tau)$ is implemented in a control 281. The function $K_i(\tau)$ is multiplied by a gain function G in a multiplier 287. The resulting term $GK_i(\tau)$ is multiplied with the input voltage $v_i$ in a multiplier 285, and is applied to the control amplifier 283 as a reference for the input current $i_i$. A feed back signal $v_s$ from the storage capacitor is squared in a squaring circuit 289 to be a measure of the energy $W_s$ stored in the storage capacitor. (If the converter has an AC input, the voltage term $v_s$ is sampled at the time when its sine term is zero by the sample and holder circuit 293). The energy term $W_s$ is compared to a reference $W_{sr}$ in an error amplifier 291. The output is used to control the gain function G. The control circuit 281 has its frequency characteristics determined by feed forward, and is shown as having a break at $1/\tau_1$, which is arbitrary, and has no stability limitations any where near the frequency of interest. The error amplifier 291 has a slow roll off, shown as $1/\tau_2$. The energy reference $W_{sr}$ can be fixed or scheduled.

2. Feed forward can be used to model the expected storage capacitor energy $w_s$ to generate an energy model $w_{sm}$ using [34]. For an converter having an AC input, the AC component of [34] must be retained. This term can be applied as the reference to an error amplifier on the capacitor voltage, which can provide control of the input modulator with a fast loop. The feed back will force the input modulator to provide the correct voltage on the storage capacitor, as it was modeled. Because $v_s$ is controlled, power balance is assured. Errors in the feed forward algorithm will result in errors in the input current function, $K_i$.

Figure 14:
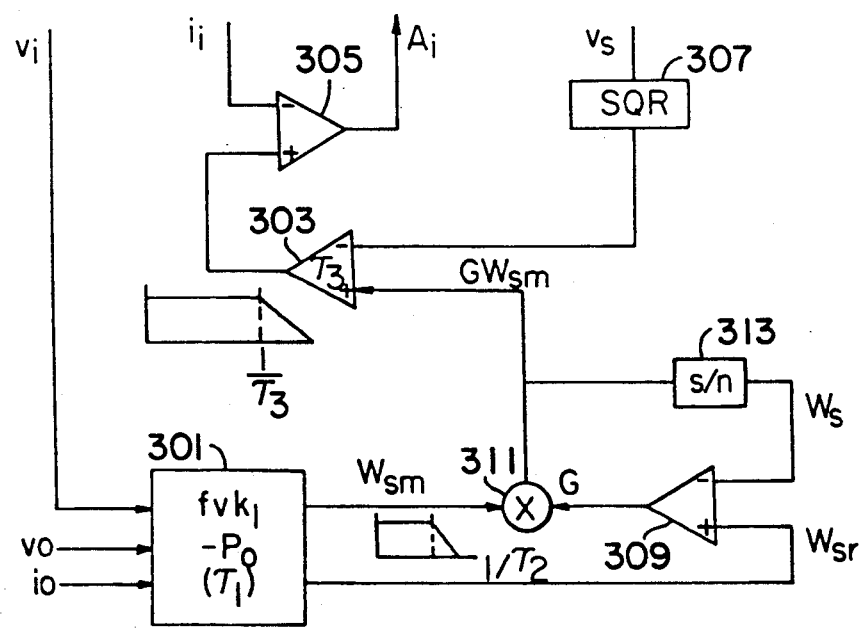
FIG. 14 is a block diagram of another embodiment of the feed forward control.

FIG. 14 shows a control circuit using this technique, and its relationship to FIG. 12 can be seen by the reference designators of the signals. A feed forward control 301 generates an explicit $K_i(\tau_1)$ as a function of $v_o$, $i_o$ and $v_i$, rolls it off at $1/\tau_1$, and multiples it by the input voltage squared to generate a function $w_{sm}$. It is multiplied by a gain G in a multiplier 311, and the resulting term $Gw_{sm}$ is applied to an error amplifier 303. The energy on the storage capacitor $w_s$ is detected as a voltage $v_s$ which is squared in the squaring circuit 307. The energy term $w_s$ is compared to the energy model $Gw_{sm}$ to control the input current control 305, which in turn controls $A_i$ so that the input current $i_i$ is correct to provide the correct energy $w_s$ in the storage capacitor.

The control circuit 301 also provides a scheduled reference $W_{sr}$ as a function of $v_o$, $i_o$ and $v_o$, and having the same time constant $\tau_1$ as $K_i(\tau_1)$. To determined if the energy $w_s$ on the storage is correct, either $w_s$ or $Gw_{sm}$ could be used, they being kept equal by the fast feed back loop. $Gw_{sm}$ is chosen because it is known to be a clean signal. A sample and hold circuit 313 extracts $W_s$ for comparison with $W_{sr}$. They are compared in the error amplifier 309 which has a slow roll off, to generate the gain term G.

In the AC-DC converter of case 5, an AC model can be generated for a reference for the voltage $v_s$ of the storage capacitor of the form of [19] by squaring the input voltage $|v_i|$. By [13], the input power is $$p_i = v_i^2 K_i \quad [35]$$

If the output power is subtracted, the result is a model of the power surplus, $p_s$.

$$p_s = p_i - p_o = v_i^2 K_i - v_o i_o \quad [36]$$

Integrating this function gives an ideal model for $v_s^2$. Sampling the model at zero crossing of the input voltage extracts the modeled $V_s$, which can be used to with a slow loop on $K_i$ to correct for drift and transients. If the $V_s$ reference is scheduled by [34], the feed back need correct only errors. Note that the feed back is a gain term on $K_i$ in the model, or an error term summed in. The control on the input modulator is fast, to keep the capacitor voltage faithful to the model. Power balance is assured. Any errors in the model will cause an error in the input current.

A large identifiable error will be the effect of efficiency $\eta$. In [14] and many other equations, the term "$v_o i_o$" appears. This expression should be reflected to the point of control to account for losses, and would generally have the form $$f(v_o i_o) = \frac{v_o i_o}{\eta} \quad [37]$$

While the efficiency $\eta$ could be approximated as a constant, it will vary with operating conditions. If $v_o i_o$ is digitized as $p_o$, a ROM (read only memory) can contain a correction schedule. Analog curve correcting techniques can be used. Losses can be modeled as $p_d$ from the system parameters and temperature and generated in the following form:

$$f(v_o i_o) = v_o i_o + p_d \quad [38]$$

The efficiency of the input modulator may have an AC component, due to the sinusoidal current and resistance.

The control methods use energy and power to the extent possible. Energy and power are linear functions, and they transcend the modulators, so no corrections are necessary for the modulator control functions or characteristics, only the losses. The modulator characteristics should be known and considered, however, to avoid measurement errors due to ripple and the switching frequency, for instance.

The input current is controlled on a tight loop as a function of the input voltage and the control constant $K_1$. The overall input control ultimately controls the input power, the product of the input current and input voltage. Accordingly, in all of the relationships developed, an exact equivalent, controlling voltage as a function of input current, could be written for a current source input.

Some special considerations apply for the AC-DC converters, cases 4 and 5. If it is desired to extract a DC component from $v_s$, the storage capacitor voltage, it is preferred not to do so by filtering it. The ripple content will be high, requiring excessive filtering (lag), and the result will be the average voltage, whereas $V_s$ of [19] and [21] is preferred. $V_s$ can be extracted with a sample and hold circuit strobed at the zero crossing of the input voltage, at which time the $\text{Sin}(2\omega t)$ term is zero. (There is a second time when $\text{Sin}(2\omega t)$ is zero, offering an opportunity to double the sampling rate. However, it would be more difficult to generate a strobe, and any error due to current and the capacitor ESR (equivalent series resistance) would be of opposite polarity). To find the energy content $W_s$, the voltage $V_s$ is squared and normalized.

In case 4, the input current is independent of the voltage, to give infinite resistance, and will have the form $|i_i| = K_i |\text{Sin}(\omega t)|$. To eliminate the influence of the input voltage magnitude, a function generator, locked to the line frequency, can generate $|\text{Sin}(\omega t)|$. It could also generate $\text{Cos}(2\omega t)$ for implementing [19], if desired.

The AC-DC converter of case 4 would not generally be considered to provide high power factor, because the input current algorithm is "wrong". However, it does have high power factor at steady state, and it provides the same control on $v_o i_o = p_o$, the output power. An argument could be made that it were superior, if minimizing the RMS value of the input current were an objective, or if noise in the input current should be limited to be a clean since wave.

Finally, if [34] is solved for capacitance, in the manner of [20], it can be seen that, due to the form of $f_v$, case 4 requires substantially less capacitance, particularly if the tolerance on $v_i$ is large.

In a high power factor controller having a latched $K_i$, there is a special problem with line frequency ripple. Line frequency ripple will result if there is a DC component in the AC voltage such that $v_i = V_i \text{Sin}(\omega t) + V_{DC}$, or if there is asymmetry in the AC wave form, as might result if an input transformer were saturated. On the output of the full wave rectifier, alternate half cycles will be of different amplitude, and perhaps of different duration.

This line frequency ripple is, of course, one half of the full wave rectified ripple frequency. The latching of $K_i$ introduces a 90° lag. If $V_i$ is measured with a filter or an integrator, another 90° or so will result, totaling nearly 180° at the line frequency. Therefore, feed forward will amplify the ripple, not reduce it.

The line frequency ripple can be measured, however, and an algorithm can be used to add it back to the control. If it does not increase the ripple, the three criteria for feed forward have been met.

The ripple component is measured by sampling alternate half cycles, and averaging each set, with decay, to give more weight to the recent samples. The difference is then taken, giving the peak to peak line frequency ripple voltage.

Subsequently, as each $V_i$ sample is measured, one half of the ripple component can be fed forward (added) to the measured value, observing polarity. To the extent that the ripple component is constant, the ripple will be cancelled. It is preferred to take the definite integral of the alternate half cycles, because this will account for time differences as well. The volt-second product is actually more important that the magnitude, and is less susceptible to errors due to glitches. To get the definite integral of each half cycle, the integrator is reset at the start of each half cycle.

The effect of the line frequency ripple feed forward is that of a lead, because it is predicting the next half cycle based upon the present half cycle and the ripple component. If the input ripple ceases, the ripple feed forward will cause a ripple, until it decays.

An additional set of control problems have as their common characteristic an "energy deficit". These can be addressed using the method of "energy deficit feed forward". An energy deficit results when a power deficit exists for a period of time, and it is the integral of the power deficit with respect to time.

The energy deficit is similar to the previously described "energy surplus" which can be accommodated by voltage scheduling on the voltage $V_s$ of the storage capacitor $C_s$. The distinction is that the "energy surplus" is accommodated by voltage scheduling, which has the effect of allowing the surplus energy $w_s$ to be stored in the storage capacitor $C_s$, and (ideally) no error results. The "energy deficit", by contrast, leaves an "error". This new method teaches that this "error" too can be accommodated by feed forward, and thus it can be systematically controlled by a strict algorithm, and the influence of feed back dynamics is removed (ideally) or reduced.

It is traditionally considered to be impossible to have a fast control if one of the control parameters is "sampled". Feed back control theory suggests that the closed loop response must have its cross over frequency at about one fifth of the sampling frequency. However, this limitation is necessary only because the sampling of a parameter imposes a limit on the information which is available about the sampled parameter for the control algorithm. What happens between the samples is relevant, but not known. To make a distinction, sampling of a parameter will be called "informational sampling".

In contrast, the "sampling" in a high power factor AC-DC converter is an "implementational sampling". The sampling, or latching of $K_i$ for the duration of each half cycle of the AC input is done purposefully, to keep the input resistance constant over the sample period, but it in no way diminishes the ability to obtain information for the control algorithm at whatever rate is necessary. By similar reasoning, the use of a low frequency lag in a control may modify the output (in this case, input current) in a desirable manner, but it need not limit the rate at which information is available for control purposes.

The energy deficit feed forward stability criteria are similar to the feed forward criteria:

1. The energy deficit can be measured.
2. An algorithm can be applied to the control function to reduce the error resulting from the energy deficit.
3. The energy deficit fed forward does not increase the energy deficit.

The last criterion can be met using the following simplification:

3 (Alternate). In determining the energy deficit to be fed forward, do not include any energy which has been fed forward.

The problem addressed by criterion 3 is sub-harmonic oscillation. If the energy deficit over a time period is caused by a frequency component in one of the inputs, and the energy deficit is fed forward with a 180°±90° lag, the error in the output due to that frequency component will be increased. If the third criteria is met, it will be stable.

The problem becomes critical if one considers that, when reapplying the energy deficit to the system, the conditions may then change again resulting in a deficit on the deficit. If this is added in and fed forward with the same 180° lag, it builds, and oscillation will occur. Given a powerful control processor, it is possible to keep separate accounting of energy deficits on energy deficits, and feed back each iteration with double the lag, so that it will not reinforce any frequency component which may have caused the original energy deficit. The alternate third criteria avoids the problem.

If it is suspected that a particular frequency component may be present, the energy deficit feed forward can be designed to cancel it, by feeding back the energy deficit with a 360° lag at that frequency. This will make errors worse at half that frequency, but they may be known to be absent or low.

As an example, line frequency ripple (which is half of the two-times-line ripple frequency of the full wave rectified input) will be present if there were any asymmetry of a DC component in the input voltage before rectifying.

In the general case, energy deficit results from the $K_i(A)$ which is actually implemented being different than the ideal, $K_i(I)$. The power deficit $p_d$ is given by $$p_d = f_t(K_i(I) - K_i(A)) \quad [39]$$

Integrating with respect to time gives the energy deficit, $w_d$:

$$w_d = \int_0^T p_d \, dt \quad [40]$$

There are a number of situations which can lead to an energy deficit, a few of which will be used as examples:

1. $K_i = K_i(\tau)$ by [31] is implemented, but voltage scheduling [34] is not used. It is required that $V_s$ have a constant quiescent voltage, perhaps because it is used as an output, or perhaps because the output modulator has been optimized for a particular voltage input.

$$p_d = f_t(K_i(t) - K_i(\tau)) \quad [41]$$

2. $K_i = K_i(0)$ is latched for the duration of a half cycle, to provide optimum power factor correction.

$$p_d = f_t(K_i(t) - K_i(0)) \quad [42]$$

3. Voltage scheduling is implemented, so $K_i(\tau)$ is the ideal $K_i$, but $K_i = K_i(0)$ is latched, for optimum power factor correction:

$$p_d = f_t(K_i(\tau) - K_i(0)) \quad [43]$$

In [43], $K_i(\tau)$ is regarded as the "ideal", not $K_i(t)$, because implementation of voltage scheduling requires that the energy of the transition equal the energy schedule.

In the above, $K_i(t)$ is the "instantaneously correct" $K_i$, where each of its components has its instantaneous value:

$$K_i(t) = \frac{v_o(t)i_o(t)}{F_v(t)} \quad [44]$$

$K_i(\tau)$ is $K_i(t)$ rolled off with a break at $\omega = 1/\tau$ and a $-1$ slope. (References to "breaks", "slopes", "roll off" and the like are to the asymptotes of a Bode plot, which is well known in the art, and are part of the jargon of the art of control design).

For case 5, $F_v = V_i^2/2$, where $V_i$ is the instantaneous value of the magnitude of the input voltage $|v_i| = V_i| \sin(\omega t)|$.

$V_i$ is not directly measurable. However $V_i^2$ can be extracted using the following identity:

$$V_i^2 = V_i^2 \cos^2(\omega t) + V_i^2 \sin^2(\omega t) \quad [45]$$

The latter term may already exist in the system, as $f_v$. The cosine squared term could be found by differentiating it, but the noise content may be high. To integrate it, the DC term must be removed, then restored.

Using a good transformer, $v_i = V_i \sin(\omega t)$ can be brought into the control (the transformer would be necessary because of the full wave rectifier). Phase shifting in two circuits having a phase difference of 90°, such as ±45°, yields a sine and cosine term which can be squared, then added. To keep the zero and infinite impedance bounded, a lead-lag and a lag-lead are preferred. If implemented carefully, with slightly more lead or lag at an intermediate frequency, the lead-lag and the lag-lead can be constructed to have ±45° phase shift at two frequencies, as for instance, 50 Hz and 60 Hz.

For case 4, it is preferred to use a function generator to generate $|\sin(\omega t)|$. The same function generator can generate a special function wave form $|\sin(\omega t)| + -|\cos(\omega t)|$ or its reciprocal. Then, if $v_i$ is phase shifted to generate sine and cosine terms, which are first full wave rectified then added, the result is $V_i(|\sin(\omega t)| + -|\cos(\omega t)|)$, the special function wave form (which must have the same phase shift) can be used to divide the sum, to extract $V_i$ as a steady state DC function.

This is sufficiently involved that simplifying approximations would be useful.

For many cases, it would be adequate to filter the full wave input voltage $|v_i|$ or its square, and use the output of the filter. Preferably it will have a nearly 90° lag at zero crossing, so if it is sampled then, the peak ($V_i^2$ or $V_i$) will be extracted. $V_i$ may be sampled, to get samples in each half cycle of $|v_i|$: $V_i(-1)$, $V_i(0)$, $V_i(+1)$, $V_i(+2)$ ... $V_i(n)$. If $V_i$ is assumed to be slowly changing, and $\tau$ is long compared to a half cycle, $K_i(\tau)$ is reasonably well approximated if each sample of $V_i(n)$ is used in a sample and hold circuit instead of the instantaneously correct term for $V_i$.

To solve for $w_d$, $p_d$ has to be integrated. Because the integral over time of $f_v \approx F_v$, these terms can be cancelled in the product $f_v K_i$, leaving $v_o i_o$. This expression is exact if it is integrated over whole half cycles of time 0 to T.

$$\int_0^T f_v \, dt = F_v \quad [46]$$

Therefore, when [42] is integrated, $$w_d(0) = \int_0^T v_o(t)i_o(t) \, dt - K_i(0) \int_0^T f_v \, dt \quad [47]$$

Equation [47] is straightforward to implement.

In using any of the approximations, careful attention should be given to phase shift. The ideal terms may assume none, and the approximations may introduce phase shifts, particularly lags.

If the effects of input voltage changes are ignored, $$w_d(0) \approx \int_0^T v_o(t)i_o(t) \, dt - v_o(0)i_o(0) \quad [48]$$

This may be reasonable. After all, load changes can be plus or minus 100%, but commercial power is reasonable steady.

Regardless of how the energy deficit is measured, calculated or approximated, it can be returned to the system under feed forward control as an increase in power $\Delta p$ (observing polarity). There are no limitations on when its is returned, but it doesn't make sense to delay too long. Reintroduction very soon may partially defeat the original control algorithm, or it may cause large spikes in the input current, but that is a design choice. If sub-harmonic frequency components are suspected to be present in any of the system inputs, the timing of the re-introduction of the energy deficit can be used to cancel any one harmonic, by lagging it 360° at that frequency.

Regardless of when energy deficit is to be introduced, if it has been measured and accounted form, but not yet reintroduced, it must be subtracted from the energy error (or added to the reference). The guiding principle is that if it is done on purpose, and accounted for, it is not an error. Of course, after the energy deficit is reintroduced, the correction on the energy error is removed, and any remaining error is due to non-ideality, and is the appropriate function of the error loop. This can be done continuously, for a non-latched system, or in fixed increments over each half cycle, in a latched system.

Figure 15A:
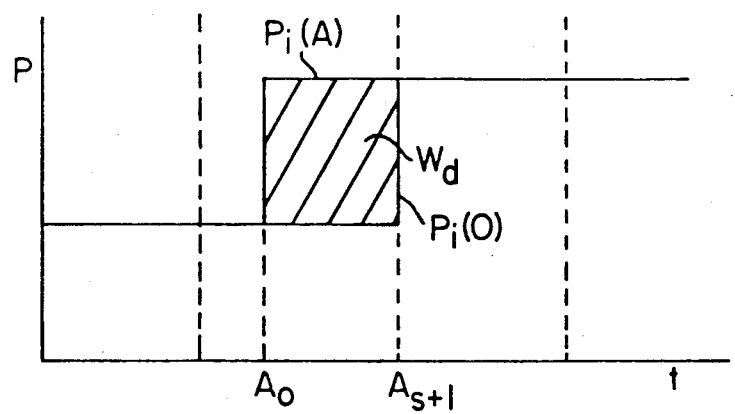
FIGS. 15a, 15b, and 15c are a graphical explanation of energy deficit and energy deficit feed forward in a control circuit employing latching.
Figure 15B:
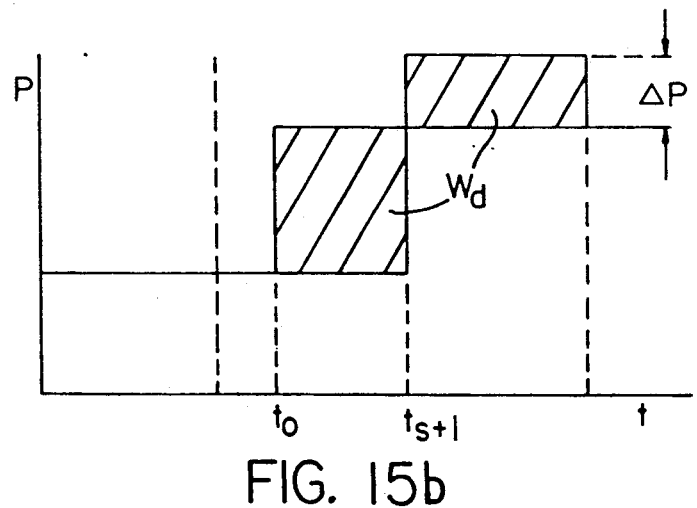
Figure 15C:
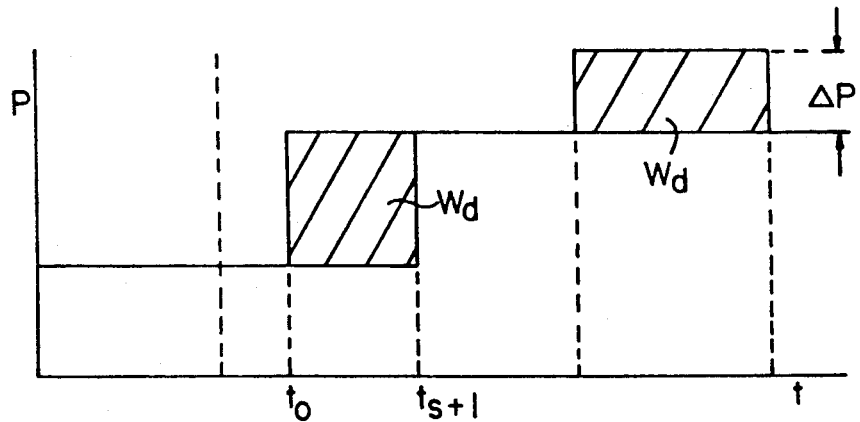
Figure 16A:
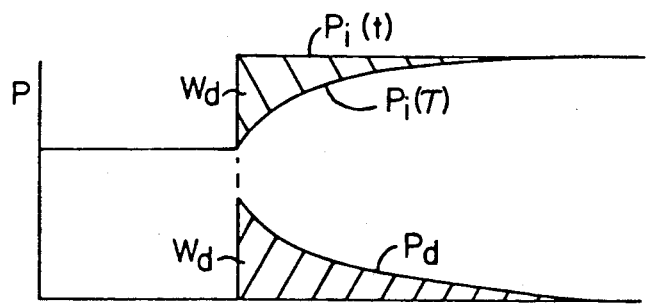
FIGS. 16a–16e are a graphical explanation of energy deficit and energy deficit feed forward control.
Figure 16B:
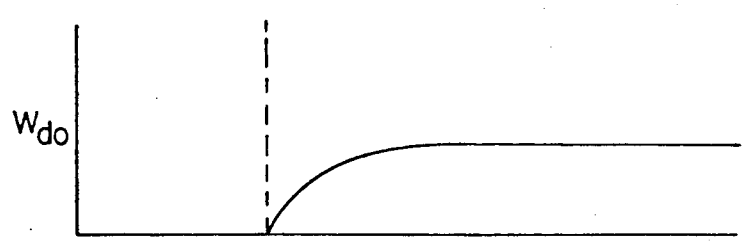
Figure 16C:
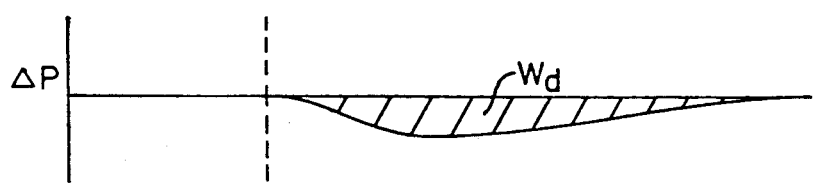
Figure 16D:
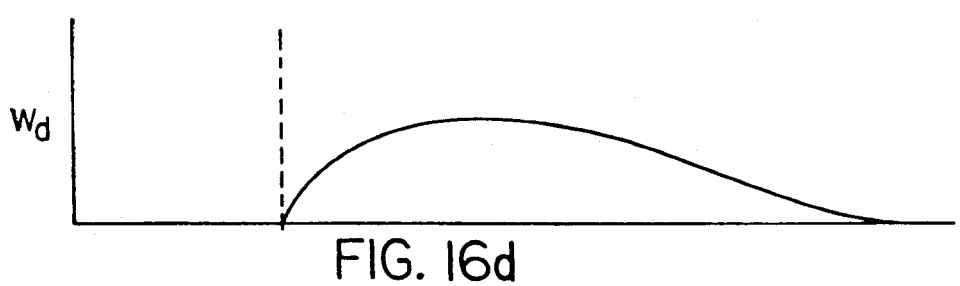
Figure 16E:
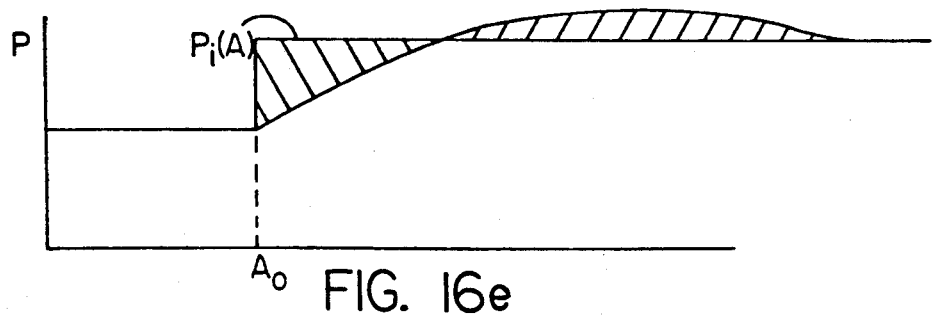

With reference now to FIG. 15, the first graph shows a step function in power occurring at $t_o$, and defining an ideal curve $p_i(t)$. Because $K_i$ is latched, the control loop does not let the system respond until the next sampling time, $t_{s+1}$. Because of the delay, an energy deficit $w_d$ results.

The next graph in FIG. 15 shows the energy deficit $w_d$ being added back as a $\Delta P$ in the next half cycle. This represents the fastest correction, and will (ideally) restore the capacitor energy and voltage to their quiescent values.

The third graph in FIG. 15 shows the energy deficit being returned in the second following half cycle. Tis is preferred, if there is a possibility that the energy deficit results from line frequency ripple. It odes not increase the error in the capacitor energy and voltage, because it will not become worse once the power balance is restored. It just allows it to persist an extra half cycle. By delaying the feed forward, the input current will not rise quite so abruptly. The energy deficit $w_d$ could be returned with a smaller $\Delta P$, over several half cycles.

With reference to FIG. 16, a first graph shows a change in the inputs $p_i(t)$. Because of the control time constant $\tau$, the input power is $p_i(\tau)$, resulting in the power deficit, the difference, $p_d$.

The second graph of FIG. 16 shows the resulting energy deficit, $w_{do}$ as it would be without energy deficit feed forward. Once it occurred, it persists, until perhaps an error loop removes it.

The third graph of FIG. 16 shows the $\Delta P$ fed forward (it has negative polarity), with a time constant of approximately $3\tau$. It has the same area under the curve (energy) as the $p_d$ of the first graph.

The fourth graph of FIG. 16 shows the net energy deficit, which reduces to zero as the $\Delta P$ is fed forward. The fifth graph shows its influence on the power. Thus the dynamics of the system, are entirely under precise feed forward control. It is unconditionally stable regardless of the time constants, but resembles the classical well damped response of a feed back loop.

Figure 17:
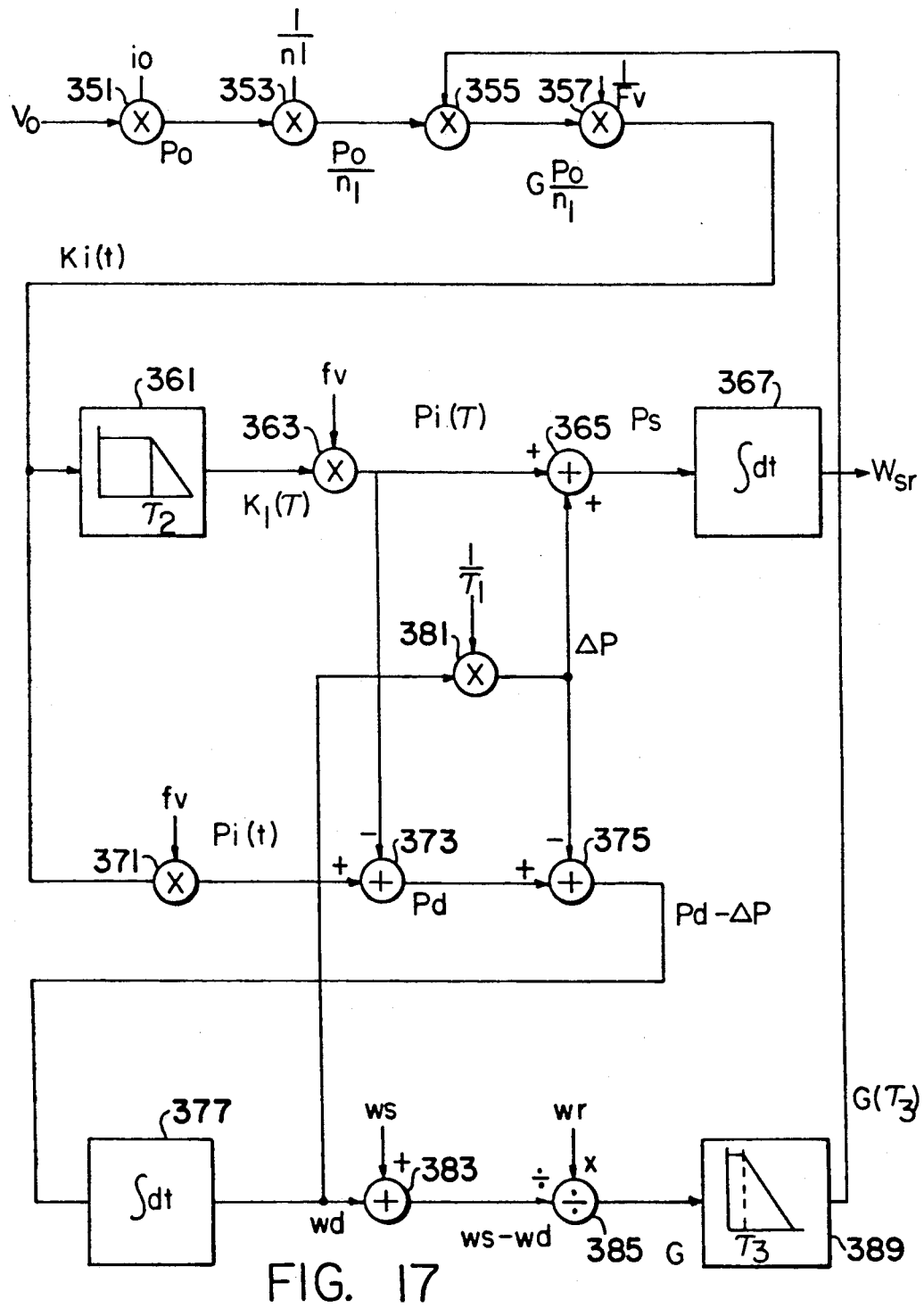
FIG. 17 is one possible implementation of the control method of energy deficit feed forward control.

FIG. 17 shows a flow diagram for a feed forward control with a response such as is shown in FIG. 16. It would be applicable to a case 3 (DC-DC) or a case 5 (a high power factor Ac-DC) converter.

The output voltage $v_o$ is multiplied in 351 by the output current $i_o$ to derive $p_o$. In a fixed output voltage supply, this is not necessary, as $i_o$ is sufficient. An efficiency algorithm is factored in, by 353. (The efficiency term could be approximated by a gain change in the outputs current sensor input for a simple system). Next a gain is factored in, by 355. Factoring in the $F_v$ reciprocal in 357 completes the synthesis of $K_i(t)$. Rolling it off in 361 synthesizes $K_i(\tau)$, and factoring in the $f_v$ term in 363 completes the power model $p_i(\tau)$.

$K_i(t)$ is factored by $f_v$ in 371, to generate $p_i(t)$. Subtracting $p_i(\tau)$ from $p_i(t)$ in 373 results in the power difference model, $p_d$. In 375, any power deficit fed forward $\Delta P$ is added to $p_d$ and integrated in 377 to obtain the net energy deficit $w_d$.

A portion of the energy deficit $w_d$, factored by the reciprocal of $\tau_1$ in 381, is added to the power model $p_i(\tau)$ in 365, then integrated in 367 to provide an energy reference $w_{sr}$. (This is analogous to the $Gw_{sm}$ of FIG. 14).

The net energy deficit $w_d$ is subtracted from the energy $w_s$ of the storage capacitor in 383 to provide a net error term, which is divided into an energy reference $w_r$ in 385 to provide an error gain term G. The error gain G is rolled off at a low $\tau$, and fed back to 355.

The above flow diagram is shown as an illustration, not a limitation, and many other implementations embodying the methods of this invention are possible. Many simplifying approximations are possible, any many of the multipliers could be adders, as often summing in a term can have the same results as factoring, appropriate adjustments being made.

Figure 18A:
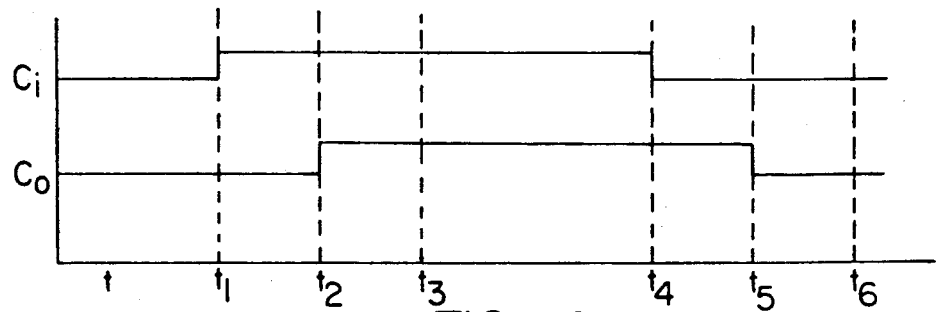
FIGS. 18a, 18b, and 18c are a graphical explanation of load-anticipation control.
Figure 18B:
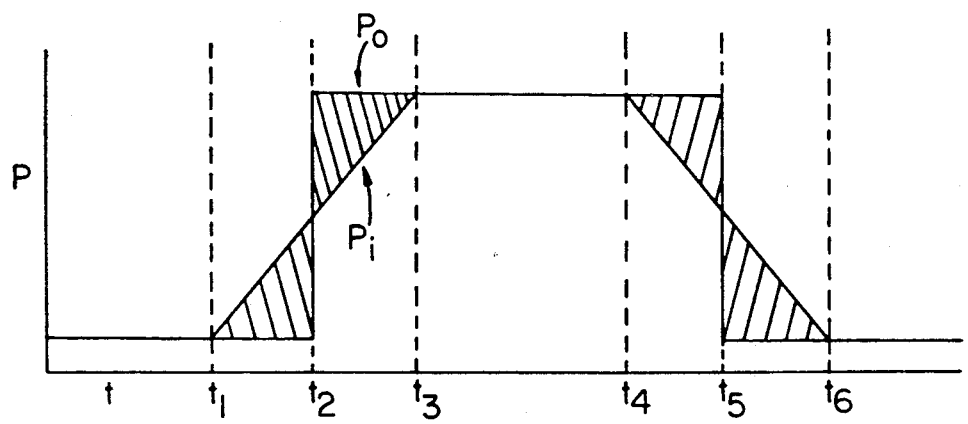
Figure 18C:
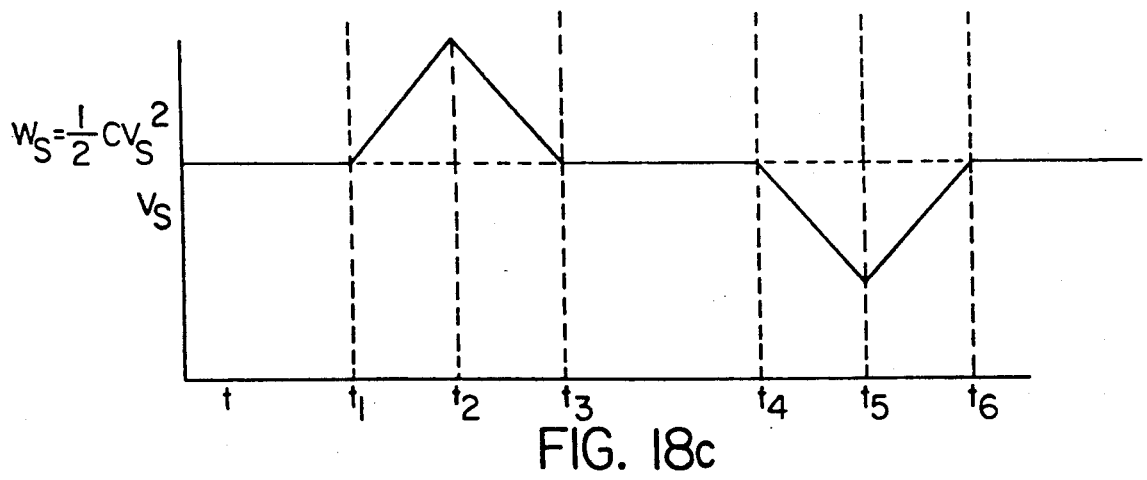

In a high power application, particularly one involving a load having ON-OFF characteristics, it may be possible to integrate the controls of the converter with the controls of the load, to provide an improved voltage scheduling on energy surplus. In FIG. 18, a load controller $C_l$ signals the power supply controller at $t_1$ that the load should be applied. The power supply controller at that time starts ramping up the input power $p_i$ as shown in the second graph, causing an energy surplus $w_s$ in the storage capacitor as shown in the third graph. When the input power $p_i$ has ramped to half its final value (as is know, because the load is fixed), the power supply controller $C_o$ signals the load controller to apply the load. As the input power $p_i$ continues to ramp to its final value, the energy surplus $w_s$ is used, and the storage capacitor energy and voltage return to their quiescent values, as shown in the third graph.

On removal of the load, a similar sequence is used, as shown. In this manner, the input power is allowed to transition arbitrarily slowly while maintaining full control and high power factor, without any overshoot or potential instability.

The foregoing examples of various embodiments of the apparatus and control methods are given as illustration and not as a limitation. In particular, the modulators are shown as general purpose modulators, it being recognized that one skilled in the art would be able to design suitable modulators using a variety know and yet to be discovered modulators, with or without transformer isolation and ratioing and for any power level and any topology, the choice being a design trade off and not at the point of novelty of the invention.

Likewise the two input buck converter can be implemented in a variety of ways and sizes, with or without transformer isolation and ratioing as is well known to those skilled in the art of buck and buck-derived modulator design.

The necessity for peripheral accessories such as input and output filters, bias supplies, operational amplifiers and the like is acknowledged, and would be known to those skilled in the art. Their exclusion from the description of any embodiment is not in any way a representation that they are not necessary, but is only a recognition that they are not at the point of novelty, and their use and application is well known to those skilled in the art.

Also, the methods of control are not limited to any specific implementation or embodiment, and could be designed with analog circuits, digital circuits or a combination of the two, or with a control processor or custom integrated circuit and controller fabrication technologies not yet discovered.

I claim:

1. A power converter using energy control comprising
    an input modulator for receiving power from a power source
    an output modulator for delivering power to a load
    the output of the input modulator being connected to a storage capacitor and the input of the output modulator
    an output sensing circuit for sensing and quantifying for an output controller and an input controller at least one of the output voltage, output current, output power or voltage of the storage capacitor
    the output controller for controlling the output in response to the at least one of the output voltage, the output current, the output power or the voltage of the storage capacitor
    an energy sensing circuit for sensing and quantifying for the input controller the energy in the storage capacitor
    an input sensing circuit for sensing and quantifying for the input controller at least one of the input current, the input voltage or the input power, and the input controller for controlling the input in response to at least one of the input voltage, the input current or the input power, and at least one of the output voltage, the output current or the output power and the energy in the storage capacitor.

2. The power converter of claim 1 further comprising a full wave rectifier at its input.

3. A power converter comprising
a first modulator for receiving power from a power source and for the delivery of power to a load
a storage capacitor
a second modulator for receiving energy from the storage capacitor and delivering the energy to the load as power
a third modulator for receiving power from the power source and delivering power to the storage capacitor for storage as energy
an output sensing circuit for sensing and quantifying for an output controller and an input controller at least one of the output voltage, output current, output power or voltage of the storage capacitor
the output controller for controlling the output in response to the at least one of the output voltage, the output current, the output power or the voltage of the storage capacitor
an energy sensing circuit for sensing and quantifying for the input controller the energy in the storage capacitor
an input sensing circuit for sensing and quantifying for the input controller at least one of the input current, the input voltage or the input power
the input controller for controlling the input in response to at least one of the input voltage, the input current or the input power, and at least one of the output voltage, the output current or the output power and the energy in the storage capacitor
and an arbitration and sequencing controller for receiving an output control signal from the output controller and for receiving an input control signal from the input controller, and for providing control signals to the first, second and third modulators such that
the first modulator supplies power from the power source to the load to the extent that the power from the power source is sufficient
the second modulator receives energy from the storage capacitor and delivers it to the load to the extent that the power from the power source is insufficient, and
the third modulator receives power from the power source and delivers it to the storage capacitor to the extent that the input power is more than sufficient.

4. The power converter of claim 3 further comprising a full wave rectifier at its input.

5. The power converter of claim 3 where the first modulator and the second modulator are embodied in a buck converter having at least two inputs comprising
an inductor
a first switching means connected from a first power source to the input of the inductor
at least one additional switching means each connected from a at least one additional power source to the input of the inductor
a rectifying means connected from a ground return to the input of the inductor, and
an output capacitor connected from the output of the inductor to the ground return.

6. The power converter of claim 5 where in the buck converter has at least a third switching means connected from at least one of an auxiliary storage capacitor or an auxiliary power supply to the input of the inductor.

7. The power converter of claim 6 further comprising a power controller means for providing a charging current for the at least one of an auxiliary storage capacitor or an auxiliary power supply.

8. A power converter of the type generally known as a buck converter, comprising
a plurality of inputs,
each of the plurality of inputs being for one of a plurality of power sources
a plurality of switching means
each of the plurality of switching means connecting from one of the plurality of inputs to the input of an inductor, and
an output capacitor connected from the output of the inductor to a ground return.

9. The power converter of claim 8 further comprising
a ground switching means connected from the ground return to the input of the inductor.

10. The power converter of claim 9 where the ground switching means is a rectifier.

11. The power converter of claim 8 wherein the input voltage of at least one of the plurality of power sources is lower than the voltage of the output capacitor.

12. A control method for a converter having a an output control means to control the output power
an input control means to control the input power
an energy storage means to store as energy any difference between the input power and the output power comprising
an output control function to control the output power to meet the output power requirements of an external load
an input control function essentially independent of the output control function to control the input power such that, dynamically the input current is controlled as a function of the input voltage and.
in steady state the input current as the ratio of the output power to the input voltage using a feed forward algorithm which is principally the output power divided by a factor the DC component of input voltage times a factor of the instantaneous input voltage.

13. The control method of claim 12 further comprising a low pass filter, for controlling the frequency response of the feed forward algorithm.

14. A control method for a converter having a an output control means to control the output power
an input control means to control the input power
an energy storage means to store as energy any difference between the input power and the output power comprising
determining the energy of a transient as
the product of a function of the instantaneous input voltage after the transit,
the time constant of the transient
and the difference between
the output power after the transient divided by the DC component of a factor of the input voltage after the treatment and
the output power before the transient divided by the DC component of a factor of the input voltage before the transient and scheduling the energy in the energy storage means as an explicit function of the output voltage, the output current, the input voltage and the time constant of the transient such that the energy of any transient is stored in the energy storage means.

15. A control method for a converter having a an output control means to control the output power an input control means to control the input power an energy storage means to store as energy any difference between the input power and the output power comprising measuring the amplitude of a ripple frequency by measuring the difference between two series of alternate peak amplitudes of the input voltage adding the difference amplitude to the peak voltage of the next sample of the lower series, and subtracting the difference amplitude from the peak voltage of the next sample of the higher series as a feed forward technique to compensate for half frequency ripple voltage.

16. A control method for a converter having a an output control means to control the output power an input control means to control the input power an energy storage means to store as energy any difference between the input power and the output power comprising determining an energy deficit function as the integral with respect to time of the difference between the input power with an ideal control algorithm and the input power with the actual control algorithm holding the energy deficit function for a period of time reducing the energy error term by the energy deficit at a later time, returning the energy deficit to the system by controlling the input modulator to input an increment of power, and simultaneously with the application of the difference power, increase the energy error term by the energy of the increment of power with time.

17. A control method for a converter having a an output control means to control the output power an input control means to control the input power an energy storage means to store as energy any difference between the input power and the output power comprising providing a control signal to the input control means in anticipation of the application of a load controlling the input power so that in increases as a function of time toward the power of the load providing a control signal to apply the load when the input power has increased to an explicit value.

* * * * *

UNITED STATES PATENT AND TRADEMARK OFFICE
CERTIFICATE OF CORRECTION

PATENT NO. : 5,132,606

DATED : July 21, 1992

INVENTOR(S) : Edward Herbert

It is certified that error appears in the above-identified patent and that said Letters Patent is hereby corrected as shown below:

COLUMN 22

Line 64, please delete "treatment" and substitute-- transient--.

Signed and Sealed this

Thirty-first Day of August, 1993

*Attest:*

BRUCE LEHMAN

*Attesting Officer*   Commissioner of Patents and Trademarks